Sept. 6, 1960

B. D. LOUGHLIN

SYNCHRONOUS DETECTOR SYSTEM FOR A COLOR-TELEVISION RECEIVER 2,951,897

Filed Feb. 1, 1957

2 Sheets-Sheet 1

Sept. 6, 1960

B. D. LOUGHLIN

SYNCHRONOUS DETECTOR SYSTEM FOR A COLOR-TELEVISION RECEIVER 2,951,897

Filed Feb. 1, 1957

2 Sheets-Sheet 2

2,951,897

SYNCHRONOUS DETECTOR SYSTEM FOR A COLOR-TELEVISION RECEIVER

Bernard D. Loughlin, Huntington, N.Y., assignor to Hazeltine Research, Inc., Chicago, Ill., a corporation of Illinois Filed Feb. 1, 1957, Ser. No. 637,708

8 Claims. (Cl. 178—5.4)

*General*

This invention relates to synchronous detector systems for the chrominance-signal portion of a color-television receiver and, particularly, to such systems for use with receivers employing three-gun color picture tubes.

As is generally known, color-television systems make use of two types of signals for conveying the requisite information for reconstructing the color image at the receiver. One of these signals is termed a luminance signal and serves to convey the monochrome or luminance data of the scene being televised. The other signal is a chrominance subcarrier signal which conveys the information regarding the added coloring which is necessary to convert the monochrome image to a color image. This chrominance signal is both amplitude- and phase-modulated, the phase determining the hue of the image and the amplitude, relative to the amplitude of the luminance signal, determining the saturation or purity of the reproduced hue. In accordance with present practice, the luminance signal is handled by one channel in the receiver and the chrominance signal is handled by another and separate channel. The chrominance channel is effective to decode the amplitude modulation of the chrominance subcarrier signal along selected phase angles of the subcarrier to obtain video signals representative of the additional red, green, and blue coloring which, along with the luminance signal, are applied to the red, green, and blue guns of the color picture tube. In order properly to decode the chrominance subcarrier signal, it is necessary to use synchronous detectors which are properly synchronized with the chrominance channel modulators at the transmitter. Such synchronization is obtained by generating a local reference signal of subcarrier frequency. The frequency and phase of such local signal are synchronized with the frequency and phase of a transmitted synchronizing burst component by the color sync circuits of the receiver. Such locally generated reference signals is then phase-shifted and supplied to the various synchronous detectors for accurately controlling the detection angles thereof.

A major problem which occurs in synchronous detector systems heretofore used in the chrominance-signal channel is that the two types of signals supplied to the synchronous detectors, namely the chrominance subcarrier signal and the locally generated reference signal, frequently escape from the synchronous detectors in undesired directions. In the first place, reference-signal components frequently leak through the synchronous detectors and back into the chrominance channel wherein they are supplied back to the input of the color sync circuits and tend to upset the operation of such circuits. Secondly, chrominance subcarrier signal components tend to leap through the synchronous detectors in the opposite direction and, hence, into the oscillator circuit which generates the local reference signal. This causes undesired modulation of the reference signal which, in turn, may cause spurious components to appear in the video signals derived by the synchronous detectors.

The nature of these undesired signal leakages is determined primarily by the detailed construction of the synchronous detector circuits and, hence, is further complicated by the required detection angles and video gains which are necessary for correct color rendition. These angles and gains are determined by the Government-fixed signal-transmission standard for color television and by the nature of the receiver picture tube. For the present case of a three-gun picture tube, such tube requires, in addition to the luminance signal, red, green, and blue color-difference signals. The detection angles for the blue and red color-difference signals are fixed by Government standards at 0° and 90°, respectively, measured in a counterclockwise or positive direction from the negative side of the burst axis. The corresponding gains relative to the luminance channel are 2.03 and 1.14, respectively. It follows from this, together with the fact that the luminance information is handled by a separate channel, that the angle and gain for the green color-difference signal are 236° and 0.703, respectively. As deliberately intended, these are a proper set of angles and gains for obtaining constant luminance operation of the receiver. The significance of constant luminance operation is that the chrominance channel of the receiver contributes no luminance components to the reproduced color image. As a result, any undesired noise components or stray radiation components which get into the chrominance channel do not produce visible luminance fluctuations in the reproduced color image. This is important in that the human eye is more sensitive to luminance fluctuations than to chrominance fluctuations. As a result, there is a substantial improvement in the signal-to-noise ratio of the chrominance channel.

It follows, therefore, that for proper color rendition the chrominance channel must derive blue, red, and green color-difference signals having effective phase angles of 0°, 90°, and 236°. It is not necessary, however, that the synchronous detectors derive these three video components directly, provided a suitable matrixing circuit is employed to transform the video components actually derived into the desired red, green, and blue color-difference components. The choice of detection angles is also somewhat dependent on whether the receiver is of the wide band-narrow band type, in which case the I and Q detection angles must ordinarily be used, or of the equiband type, in which case any desired combination of the various detection angles may be used. The present discussion shall be limited to receivers of the equiband type as these are the more common due to their lower cost. In such receivers, it has heretofore been the common practice to use a pair of synchronous detectors operating directly at the blue and red color-difference angles of 0° and 90° and then matrixing portions of these two signals to obtain a green color-difference signal. A synchronous detector system of this type, however, usually suffers from undesirably large amounts of the undesired signal leakages previously mentioned. As a result, additional circuits for purposes of isolation are generally required to obtain the desired stability of such systems.

A recent solution which has been proposed for this problem of undesired signal leakage is to use four synchronous detectors, divide them up into two pairs, and then balance the operation of each pair so that a minimum of undesired signal leakage occurs for each. More specifically, the two members of one pair are operated at phase angles which are 180° apart and, consequently, any feedback components by way of one member of the pair then cancel corresponding feedback components by way of the other member of the pair. In a similar fashion, the two members of the other pair are operated 180° apart but along a different phase axis from the first pair. A synchronous detector system of this sort, however, is generally more costly in that it requires more tubes and a more complex matrixing circuit than the simpler forms of such systems heretofore used. Accordingly, it would be desirable to have a synchronous detector system which affords a minimum of undesired signal leakage while at the same time being less costly and complex in nature.

It is an object of the invention, therefore, to provide a new and improved synchronous detector system for the chrominance-signal portion of a color-television receiver which avoids one or more of the foregoing limitations of such systems heretofore proposed.

It is another object of the invention to provide a new and improved synchronous detector system of less costly construction and wherein undesired signal leakages are substantially minimized.

It is a further object of the invention to provide a new and improved synchronous detector system wherein the synchronous detectors may be operated at symmetrical 120° spaced phase angles while still obtaining constant luminance operation of the receiver with a minimum of expense and circuit complexity.

In accordance with the invention, a synchronous detector system takes the form of a three-phase synchronous detector system for the chrominance-signal portion of a color-television receiver and comprises a first channel for supplying a chrominance signal and a second channel for supplying a reference signal of subcarrier frequency. The detector system also includes three synchronous detectors coupled to the chrominance-signal channel for deriving three video signals representative of the coloring of the scene being televised. In addition, the system includes circuit means for translating components of the reference signal used for demodulating purposes to the synchronous detectors at such phase angles and amplitudes that the sum of any of the reference-signal components fed back to the chrominance channel is zero and for translating any chrominance-signal components supplied thereto with such phase angles and amplitudes that the sum of such components fed through to the reference-signal channel is zero. The system further includes an asymmetrical matrix circuit responsive to the three video signals for converting the video detection angles to the red, green, and blue color-difference angles and for modifying the video gains to develop red, green, and blue color-difference signals proportioned to obtain constant luminance operation of the receiver.

For a better understanding of the present invention, together with other and further objects thereof, reference is had to the following description taken in connection with the accompanying drawings, and its scope will be pointed out in the appended claims.

Referring to the drawings.

Figure 1:
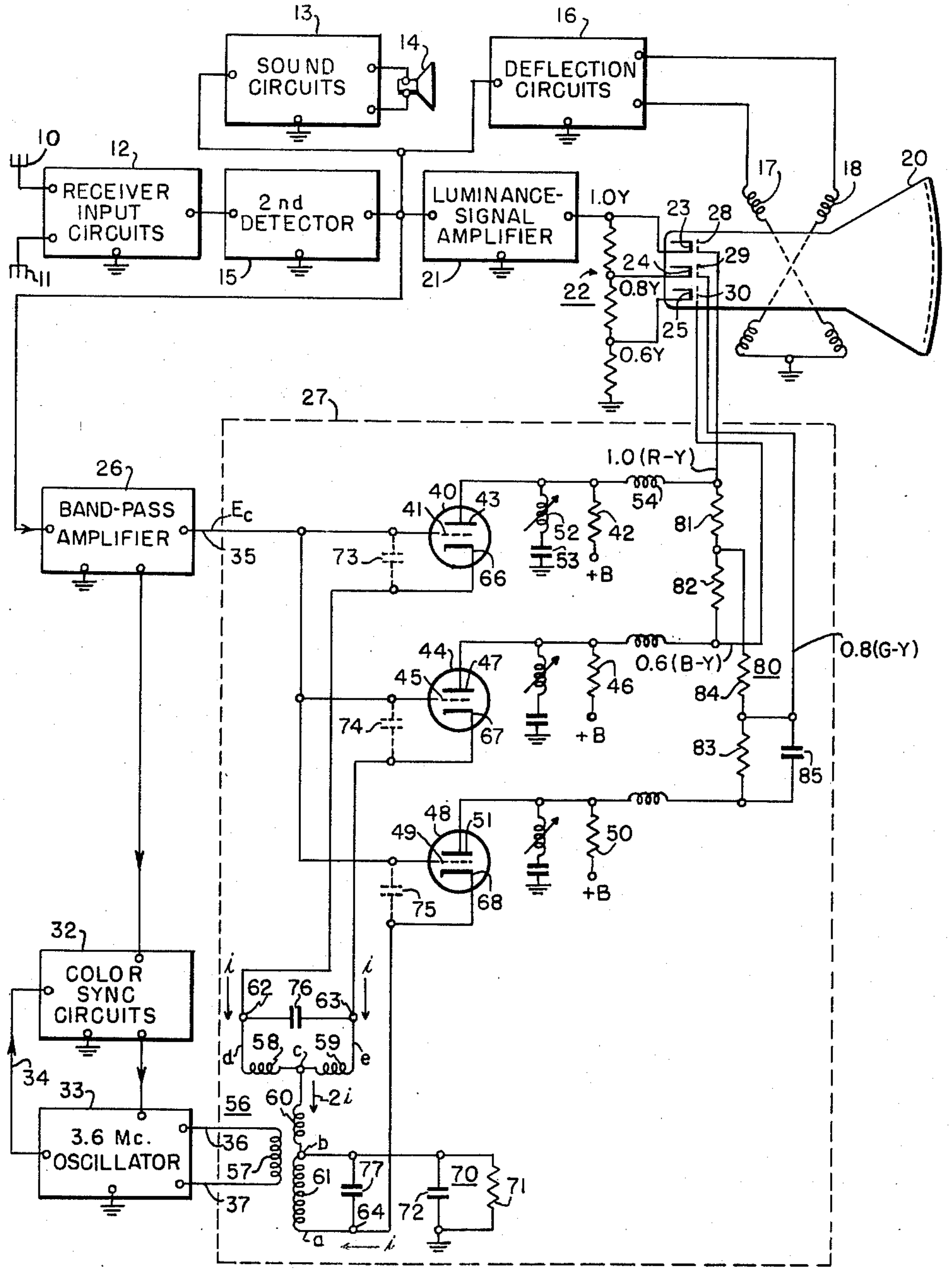
Fig. 1 is a circuit diagram, partly schematic, of a complete color-television receiver including a representative embodiment of a synchronous detector system constructed in accordance with the present invention.

*General description of color-television receiver of Fig. 1*

Referring to Fig. 1 of the drawings, the representative form of color-television receiver there shown includes an antenna system 10, 11 for intercepting the composite color-television signal radiated by a transmitter. Such composite signal is then amplified and changed in frequency by receiver input circuits 12 which may, for example, include the usual radio-frequency amplifier, frequency converter, and intermediate-frequency amplifier stages. The intermediate-frequency composite signal is then supplied to a second detector 15 which may take the form of a simple diode detector circuit and which is effective to detect the video-frequency modulation components of the intermediate-frequency carrier. A sound-signal portion of the detected composite video signal, corresponding to the 4.5 megacycle beat note between the sound and picture carriers, is selected by sound circuits 13 which, in turn, develop a suitable audio signal for a loudspeaker 14. The deflection synchronizing components of the composite video signal at the output of the second detector 15 are processed by deflection circuits 16 wherein they serve to control the generation of the usual line-scanning and field-scanning currents which are, in turn, supplied to the vertical and horizontal deflection coils 17 and 18 which are disposed adjacent a color picture tube 20 in the usual manner.

The luminance-signal portion of the composite video signal at the output of the second detector 15 is translated by a luminance-signal amplifier 21 and a voltage-divider circuit 22 to cathodes 23, 24, and 25 of the red, green, and blue electron guns, respectively, of the color picture tube 20. The voltage divider 22 is utilized to adjust the signal amplitudes in order to compensate for the unequal phosphor efficiencies of the red, green, and blue phosphors of the picture tube 20. For currently available picture tubes, the signal amplitude to the green cathode 24 should be 0.8 of that to the red cathode 23 while the signal amplitude to the blue cathode 25 should be 0.6 of the signal supplied to the red cathode 23. The phosphor efficiencies, of course, vary in the inverse manner of the signal amplitudes so that, in effect, unity gain is achieved for all three phosphors.

The chrominance subcarrier signal portion of the composite video signal at the output of the detector 15 is translated by way of a band-pass amplifier 26 to a synchronous detector system 27 which is constructed in accordance with the present invention and which will be discussed more in detail hereinafter. Such synchronous detector system 27 is effective to decode the amplitude modulation of the chrominance subcarrier along selected phase angles so as to derive red, green, and blue color-difference signals which are, in turn, supplied to control electrodes 28, 29 and 30 of the red, green, and blue electron guns of the picture tube 20. As for the case of the luminance signal, these color-difference signals must be proportioned so as to take into account the unequal efficiencies of the red, green, and blue phosphors. Assuming this to be the case, then the red, green, and blue electron guns develop electron beams for energizing the red, green, and blue phosphors and the intensities of such beams are varied in the correct manner for reproducing the desired color image on the face of the picture tube 20.

Included along with the chrominance subcarrier signal at time-spaced intervals corresponding to the retrace intervals of the deflection synchronizing components are color-synchronizing bursts, each burst comprising approximately 10 cycles of a 3.6 megacycle signal. This sync burst component is also passed by the band-pass amplifier 26 and then selected by the color sync circuits 32 wherein it is effective to develop a control signal for controlling the frequency and phase of a local 3.6 megacycle oscillator 33. Such color sync circuits 32 may include the usual phase detector and reactance tube circuits and, in the operation thereof, a replica of the signal developed by the oscillator 33 may be supplied back to the phase detector by way of the conductor 34. The reference signal generated by the oscillator 33 is, in turn, supplied to the synchronous detector system 27 of the present invention in order to control the detection angles of the individual synchronous detectors included therein.

*Description of synchronous detector system of Fig. 1*

Considering now more in detail the synchronous detector system 27 of Fig. 1, such system is a representative embodiment of a three-phase synchronous detector system constructed in accordance with the present invention for use in the chrominance-signal portion of a color-television receiver. Such system includes a first channel for supplying a chrominance signal. This chrominance-signal channel includes, for example, the band-pass amplifier 26 and a conductor 35 for supplying the chrominance subcarrier signal $E_c$ to the synchronous detector system 27. In addition, the system includes a second channel for supplying a reference signal of sub-carrier frequency. Such second channel may, for example, include the 3.6 megacycle oscillator 33 and input conductors 36 and 37 for supplying the reference signal to the synchronous detector system 27.

The synchronous detector system of the present invention also includes three synchronous detectors coupled to the chrominance-signal channel for deriving three video signals representative of the coloring of the scene being televised. Each of such synchronous detectors preferably includes a similar electron-discharge device and energy-supply circuit, corresponding first electrodes of the devices being coupled to the chrominance-signal channel. To this end, a first of such synchronous detectors includes an electron-discharge tube 40 having a first or control electrode 41 which is coupled to the chrominance-signal channel represented by the band-pass amplifier 26. The energy-supply circuit of this first synchronous detector includes a load resistor 42 coupled between an output electrode or anode 43 of the tube 40 and a source of operating potential +B. In a similar manner, a second of the synchronous detectors includes an electron-discharge tube 44 having a first or control electrode 45 which is coupled back to the band-pass amplifier 26 and a load resistor 46 coupled between an anode 47 and +B. Similarly, the third synchronous detector includes an electron-discharge tube 48 having a first or control electrode 49 coupled back to the band-pass amplifier 26 and a load resistor 50 coupled between an anode 51 and +B. Each of the synchronous detectors may also include a subcarrier trap which, for the first detector, takes the form of an inductor 52 connected in series with a condenser 53, both of these being proportioned to be series-resonant at the subcarrier frequency. In order to minimize translation of undesired heterodyne components, the first synchronous detector may also include a choke and peaking coil 54 connected in series with the anode 43 and the output terminal of the detector. The other two synchronous detectors may, likewise, include similar subcarrier traps and choke and peaking coils as indicated in the drawing.

The synchronous detector system also includes circuit means for translating the reference signal to the synchronous detector tubes 40, 44, and 48 at such phase angles and amplitudes that the sum of any reference-signal components fed back to the chrominance channel is zero and for translating any chrominance-signal components supplied to such transformer with such phase angles and amplitudes that the sum of such components fed through to the reference-signal channel is zero. This circuit means may take the form of a transformer 56 having a primary winding 57 coupled to the oscillator 33 and a plurality of secondary windings 58, 59, 60, and 61 which are interconnected to form a Y configuration. The resulting Y secondary has three output terminals 62, 63, and 64 which are individually coupled to corresponding second electrodes of the synchronous detector tubes 40, 44, and 48 which, in this case, are the cathodes 66, 67, and 68 of the respective tubes. The Y secondary is unbalanced in that a point part way down one leg of the Y, namely the point intermediate the secondary coils 60 and 61, is connected to a point of fixed reference potential such as chassis ground. In this case, the connection is by way of a biasing circuit 70 including a resistor 71 and by-pass condenser 72. This common biasing network 70 serves to supply the same amount of bias to each of the synchronous detector tubes 40, 44, and 48.

In the simplest case, the three synchronous detector tubes 40, 44, and 48 should have, as nearly as possible, the same electrical characteristics. Especially, the inherent cathode-to-control electrode capacitance, as indicated by the dotted interelectrode condensers 73, 74, and 75, should be substantially the same. Alternative forms of construction will be mentioned hereinafter.

In order to produce reference-signal components whose vector sum is substantially zero, it is necessary that the amplitudes and phases of these reference-signal components as they appear at the three output terminals 62, 63, and 64 be properly proportioned. To this end, the relative number of turns of the various secondary windings should be proportioned as will be explained more fully hereinafter. It will be mentioned briefly, however, that for one form of construction the windings 58 and 59 should have the same number of turns while winding 60 should have half the number of turns as winding 61. Also, a desired 90° phase shift may be obtained between coils 58 and 59 and coils 60 and 61 by tightly coupling one of the pairs, for example windings 60 and 61, to the primary winding 57 and by connecting condensers 76 and 77 as indicated and selecting the value of condenser 76 so as to form with coils 58 and 59 a circuit which is resonant at the subcarrier frequency of 3.6 megacycles and, likewise, by choosing the value of condenser 77 so that it forms with the coil 61 a circuit which is resonant at 3.6 megacycles. In order that the feedthrough of chrominance-signal components into the 3.6 megacycle oscillator 33 may be reduced, the coils 58 and 59 must be very tightly coupled to one another so as to have a mutual coupling coefficient of very nearly unity. In a similar manner, the coils 60 and 61 should have a unity mutual coupling coefficient. Such a high degree of coupling may be obtained, for example, by using windings of the bifilar type. As far as the reduction of chrominance-signal feedthrough is concerned, the other coefficients of coupling, such as between the various secondary coils and the primary coil 57, are not critical and may be proportioned as required. Also, for complete cancellation of chrominance-signal feedthrough, the number of turns of winding 58 must be the same as those of winding 59 while winding 60 must have half as many turns as winding 61, these requirements already being met where the reference-signal components are caused to have a vector sum of zero as mentioned above.

The synchronous detector system of the present invention further includes an asymmetrical matrix circuit 80 which is responsive to the three video signals from the synchronous detector tubes 40, 44, and 48 for converting the video detection angles to the red, green, and blue color-difference angles and for modifying the video gains to develop red, green, and blue color-difference signals proportioned to obtain constant luminance operation of the receiver. Such asymmetrical matrix circuit 80 may take the form of a resistor network including a mutual resistor represented by a pair of resistors 81 and 82 which are coupled across corresponding output electrodes of two of the electron-discharge devices, namely the synchronous detector tubes 40 and 44, for converting their video detection angles to the red and blue color-difference angles. The resistor matrix may also include adding resistors 83 and 84 coupled between the corresponding output electrode of the third electron-discharge device, namely the detector tube 48, and an intermediate point on the mutual resistor, namely the point intermediate resistors 81 and 82, for obtaining a signal corresponding to substantially the green color-difference signal. The resistance values of the resistors 81–84, inclusive, are proportioned for obtaining the red, green, and blue color-difference signals with the proper amplitudes. In this regard, the proportioning of these resistors preferably also takes into account the unequal efficiencies of the red, green, and blue phosphors of the picture tube 20. The adding resistor 83 may be shunted by a compensating condenser 85.

*Operation of synchronous detector system of Fig. 1*

Considering now the operation of the synchronous detector system 27 just described, the problem is to have a system wherein undesired leakage of chrominance-signal components into the reference-signal oscillator 33 and, conversely, the leakage of reference-signal components into the band-pass amplifier 26 are held to a minimum while at the same time having a system which will enable constant luminance operation of the receiver. Since the presently adopted signal standard is such that correct operation of the receiver also corresponds to constant luminance operation of the receiver, the fact of constant luminance operation may simply be referred to by saying that the receiver operates in a correct manner for the type of signal which is transmitted.

As mentioned, the chrominance subcarrier signal $E_c$ is supplied equally to each of the three synchronous detector tubes 40, 44, and 48. Also supplied to each of these tubes are 3.6 megacycle reference-signal components. Each of the tubes then functions as a product modulator producing the usual sum-frequency and difference-frequency heterodyne components, the difference-frequency component being the video amplitude modulation of the chrominance subcarrier at a particular phase angle thereof. The 7.2 megacycle sum-frequency components are eliminated by the low-pass nature of the output circuit and the choke coils. Recovering the amplitude modulation at a a particular subcarrier phase angle gives a video signal which is representative of one component of the hue or color being transmitted, the magnitude of this modulation relative to the magnitude of the luminance signal determining the purity or saturation of this component. The detection angle for each detector tube is determined by the phase of the reference-signal component which is supplied to the tube.

Figure 2:
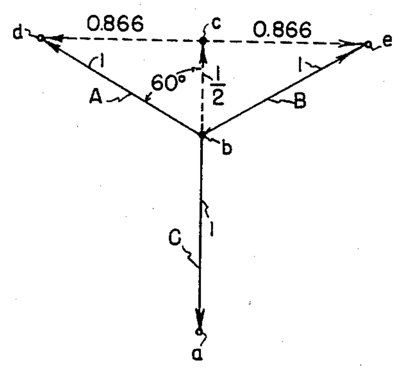
Fig. 2 is a vector diagram used in explaining the operation of a transformer portion of the synchronous detector system of Fig. 1, and Figs. 3, 4, and 5 are vector diagrams used in explaining the operation of a matrix circuit portion of the synchronous detector system of Fig. 1.

The reference-signal components for the three tubes 40, 44, and 48 are obtained by way of the 3.6 megacycle oscillator 33 and the transformer 56. To this end, the oscillator 33 develops a continuous 3.6 megacycle signal, the phase of which is accurately synchronized with the transmitted signal by way of the color sync circuits 32 previously mentioned. This reference signal from the oscillator 33 is then supplied by way of the primary coil 57 of the transformer 56 to the various secondary coils 58–61, inclusive, of the transformer 56. The phases and amplitudes of the resulting components developed across the individual ones of the coils 58–61, inclusive, have different amplitudes and phase angles which add up to produce at the three output terminals 62, 63, and 64 proper reference-signal components for operating the three synchronous detector tubes. One example of the manner in which these individual components add up may be seen by referring to the vector diagram of Fig. 2. As there seen, a reference-signal component C of length *a—b* is developed across the coil 61. A component of length *b—c* is developed across the coil 60 and such component lies along the same phase axis but with opposite polarity due to the push-pull type interconnection of coils 60 and 61. Also, the component *b—c* is one-half the amplitude of the component *a—b* because coil 60 is made to have one-half the number of turns as coil 61. Primary coil 57 also induces across the coil 58 a vector component *c—d* having an amplitude which is 0.866 of the amplitude across coil 61, the number of turns on coil 58 and the mutual inductance between coil 58 and the primary 57 being proportioned to produce this result. Similarly, a component represented by vector *c—e* is developed across coil 59. Vectors *c—d* and *c—e* are 180° out of phase due to their push-pull interconnection. Also, each of the vectors *c—d* and *c—e* is shifted in phase by 90° relative to the components developed across coils 60 and 61. This results from the fact that the indicated winding portions are shunted by condensers 76 and 77 so as to form a doubly tuned coupled circuit. This relies on the basic fact that 90° phase difference exists between the primary and secondary windings of a doubly tuned coupled circuit. In this regard, the coil 61 and its condenser 77 may be considered as the primary tuned circuit because of its tight coupling to primary winding 57 while coils 58 and 59 plus the condenser 76 may be considered as the tuned secondary circuit.

Considering the point *b* intermediate coils 60 and 61 as being at ground potential for the 3.6 megacycle components, which it in fact is due to the by-pass condenser 72, then there appears at the output terminal 64 the vector component C of unit length. The resultant signal at the output terminal 62, on the other hand, is composed of the individual vector components across coils 58 and 60 which resultant is indicated by the vector A of Fig. 2 and is also unit length. In the same manner, the resultant signal at the output terminal 63 is represented by the vector B of unit length. As a result, the three synchronous detector tubes 40, 44, and 48 are operated at symmetrical 120° spaced phase angles. As a result, and also due to the similar characteristics of the tubes 40, 44, and 48, any reference-signal components fed back to the band-pass amplifier 26, principally by way of the interelectrode condensers 73, 74, and 75, will add up vectorially to zero. In other words, no, or at least a minimum of, leakage of the reference-signal components back into the band-pass amplifier 26 will occur. As a result, the operation of the color sync circuits 32 which are also coupled to the band-pass amplifier 26 will not be disturbed.

It is clear that such cancellation of the reference-signal components will occur when symmetrical 120° spaced phase angles are utilized. It should be noted, however, that such cancellation will equally as well occur for other combinations of phase angles provided the amplitudes are so adjusted that the vector sum of the three reference-signal components as fed back to the band-pass amplifier 26 adds up to zero. One benefit of this is that the phase shift between either of the coils 58 and 59 and the coil 61 need not be exactly 90° provided the relative number of turns of the coils is proportioned as previously indicated. This is possible because when such phase shift is other than 90° the amplitudes as well as the phases are altered such that the vector sum for all three reference-signal components is still zero. In a similar manner, the coefficients of coupling to the coils 58 and 59 may depart from those values for which the signal components developed thereacross are 0.866 the value of the signal component across coil 61, provided the signal components across coils 58 and 59 remain equal to one another. This flexibility of design also affords a means of producing the desired signal cancellation where the characteristics of the three synchronous detector tubes 40, 44, and 48 are not identical. For ease of understanding, the subsequent explanation of the invention will be given for the case of the symmetrical 120° spaced signals, it being clearly understood, however, that the basic criterion is, as mentioned, that the vector sum of the three add up to zero.

In addition to reducing leakage of reference-signal components back into the band-pass amplifier 26, the synchronous detector system of the present invention also reduces leakage of chrominance-signal components into the 3.6 megacycle oscillator 33. To understand this latter leakage reduction, assume that equal amounts "*i*" of chrominance-signal components are present at the three output terminals 62, 63, and 64 of the transformer 56. These chrominance components "*i*" are so present due to the flow of cathode current from each of the three tubes 40, 44, and 48 to ground by way of the transformer 56 and the biasing network 70. If, as previously mentioned, the coils 58 and 59 have the same number of turns and are very tightly coupled as, for example, by making them bifilar windings, then the flow of chrominance components into the two terminals 62 and 63 from opposite directions will cause no net difference of potential to occur across either of the coils 58 and 59. There is, however, a current flow of "2i" down through the coil 60 towards the chassis ground. At the same time there is a current flow of "i" entering the coil 61 by way of the output terminal 64. As mentioned, however, coil 60 has only one-half as many turns as coil 61 and also these coils are very tightly coupled. As a result, the current flow of "2i" through one-half as many turns induces a voltage which is exactly equal and opposite to the voltage induced by the current flow "i" through coil 61. As a result, no, or at least a very minimum of, net chrominance-signal components appear across the terminals of the primary winding 57 and, hence, are fed back to disturb the operation of the oscillator 33. Note that the phase shift and the coefficient of coupling between the primary tuned circuit (coil 61 and condenser 77) and the secondary tuned circuit (coils 58 and 59 and condenser 76) do not enter into this result and, therefore, are not critical in this regard either.

Figure 3:
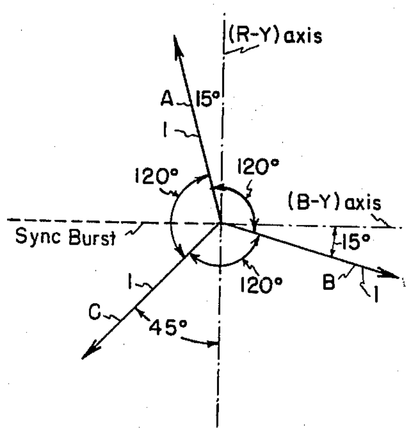
Figure 4:
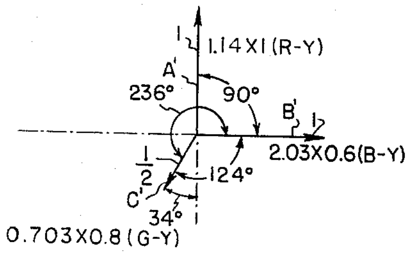

Having shown how undesired signal leakages are minimized, it is now necessary to show that correct operation of the receiver can still be obtained using the particular detection angles necessary to minimize the signal leakage. To this end, reference is now made to the vector diagram of Fig. 3 which, for the moment, can be considered as showing the reference-signal components A, B, and C of Fig. 2 relative to the red and blue color-difference axes of the chrominance subcarrier signal. As there indicated, these reference-signal components are of equal amplitude and symmetrically spaced 120° apart, the components A and B to the detector tubes 40 and 44 being positioned 15° on either side of the red and blue color-difference axes $(R-Y)$ and $(B-Y)$. The vector diagram of Fig. 3 is actually intended to represent the detection angles and relative gains for the three synchronous detector tubes, the angles being determined by the angles of the corresponding reference-signal components and the gains being determined by the gain characteristics of each tube stage, these gains being assumed to be equal for the present case. These, however, are not the proper angles and gains for producing correct video-signal components which, upon application to the picture tube, will produce correct color rendition. As mentioned, the correct angles for the blue, red, and green color-difference signals are 0°, 90°, and 236°, while the corresponding gains, assuming equal phosphor efficiencies, are 2.03, 1.14, and 0.703, respectively. It is necessary, therefore, to provide an asymmetrical matrixing circuit for converting both the detection angles and the gain factors of the video components actually developed to these desired values. Also, as mentioned, it is desired that the matrix circuit also take into account the unequal phosphor efficiencies so as to further proportion the resulting video components to compensate for such unequal phosphor efficiencies. When this is done, it is found that the necessary detection angles and gain factors for correct color rendition are as indicated by the vector diagram of Fig. 4 where vectors A′, B′, and C′ indicate the signal components desired for the control electrodes 28, 30, and 29, respectively, of the picture tube 20. In other words, three synchronous detectors operating with the phase angles and gains indicated in Fig. 4 would produce correct video components which could be supplied directly to the control electrodes of the picture tube 20 without need for a matrix circuit. In the present case, therefore, the matrix circuit represented by the resistor network 80 must be capable of converting the phase angles and gains of Fig. 3 to those of Fig. 4. It is interesting to note that the relative amplitudes of the vectors A′, B′, and C′ of Fig. 4 are approximately 1, 1, and ½, respectively.

Figure 5:
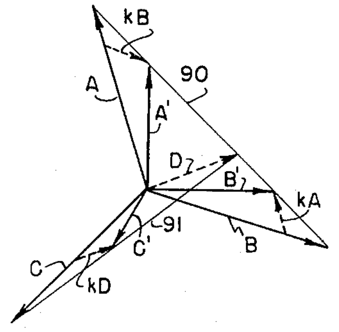

The operation of the resistor matrix 80 in converting the signals to the proper gains and phase angles shall be explained with the help of the vector diagram of Fig. 5 which makes use of the gain-phasor representation employed by color-television engineers. In other words, the phase angles shown in the vector diagrams of Figs. 3, 4, and 5 refer to phase angles of the subcarrier. It is apparent, however, that once the signal components are detected by the synchronous detectors the sub-carrier is no longer present. It is still useful, however, to speak in terms of the subcarrier phase angles and this is legitimate in that the combination of a synchronous detector plus the matrix may be thought of as a new synchronous detector operating at a different phase angle and with a different gain. Another way of looking at it, assuming that the red and blue color-difference components are the two chrominance subcarrier signal primaries, is that the video output from a synchronous detector operating at any arbitrary detection angle will contain certain proportions of the red and blue color-difference video information. The vector representation, therefore, is a convenient way of keeping track of these proportions of red and blue color-difference information and, hence, enables the operation of the matrix to be more readily grasped. This gain-phasor technique is discussed more in detail in the text Principles of Color Television by The Hazeltine Laboratories Staff, published by John Wiley & Sons, Inc., 1956, at page 410 et seq.

Considering now the operation of the resistor matrix 80 and with reference to Fig. 5, the mutual resistors 81 and 82 coupled across the outputs of the synchronous detector tubes 40 and 44 serve to cross couple certain fractions of the video signals developed by these tubes. In other words, as indicated in Fig. 5, a certain fraction of the component A available from tube 40 when the matrix is disconnected has a certain fraction $k$B of the B component from tube 44 added in with it to produce the resultant vector A′. Conversely, a certain fraction of the B component available at the output of tube 44 when the matrix is disconnected has added to it a certain fraction $k$A of the A component from tube 40 to produce the resultant vector B′. These various fractions are determined mainly by the total resistance of resistors 81 and 82, the internal resistances of tubes 40 and 44, and the tube load resistors 42 and 46. Note that due to the adding circuit effect the resultant vectors A′ and B′ terminate along the straight line 90 drawn between the two ends of the vectors A and B.

The desired green color-difference component represented by the vector C′ is then obtained by means of the adding resistors 83 and 84. In other words, the signal at the top of resistor 81 is represented by the vector A′ while the signal at the bottom of resistor 82 is represented by the vector B′. At intermediate points along the mutual resistors various proportions of these components A′ and B′ may be obtained. The tips of the vectors corresponding to these various proportions will lie along the line 90. A suitable point is selected so as to obtain a resultant component represented by the vector D. This component D is then supplied to the adding circuit by way of the adding resistor 84. At the same time, the component C is supplied to the adding circuit by way of the adding resistor 83. As a result, the signal appearing at the junction of the adding resistors 83 and 84 corresponds to certain proportions of the vector components C and D, the tip of the resultant vector lying along the line 91 drawn between the tips of the input vectors C and D. In other words, adding resistors 83 and 84 are effective to add a certain fraction $k$D of the component D to a certain fraction of the component C to produce the desired green color-difference component C′. Accordingly, the desired phase angles and gains for the signals supplied to the three control electrodes of the picture tube 20, as indicated in Fig. 4, are obtained.

The simplicity of construction and consequent low cost of the matrix 80 for doing the complex task of converting both the phase angles and gains of the video components to those necessary for correct color rendition should be especially noted. As a result of this, it is both possible and practical to operate three synchronous detectors at three symmetrical phase angles to secure the desired reduction in signal leakage.

While applicant does not intend to limit the invention to any particular design constants, the following values have been found suitable for the particular embodiment of synchronous detector system shown in Fig. 1:

| | |
|---|---|
| Coil 52 | 200 microhenries. |
| Coil 54 | 1.1 millihenries. |
| Condenser 53 | 10 micromicrofarads. |
| Condenser 72 | 0.01 microfarad. |
| Condenser 76 | 560 micromicrofarads. |
| Condenser 77 | 1500 micromicrofarads. |
| Condenser 85 | 10 micromicrofarads. |
| Resistor 42 | 22 kilohms. |
| Resistor 46 | 22 kilohms. |
| Resistor 50 | 22 kilohms. |
| Resistor 71 | 390 ohms. |
| Resistor 81 | 18 kilohms. |
| Resistor 82 | 12 kilohms. |
| Resistor 83 | 47 kilohms. |
| Resistor 84 | 47 kilohms. |
| Tube 40 | One triode section of type 6CG7. |
| Tube 44 | One triode section of type 6CG7. |
| Tube 48 | One triode section of type 6BJ8. |
| Voltage (+B) | +385 volts. |

It should be noted that the electrical characteristics of the triode sections of tube types 6CG7 and 6BJ8 are very similar in nature and, hence, no appreciable difficulty is encountered because of the use of these different tube types.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A three-phase synchronous detector system for the chrominance-signal portion of a color-television receiver, the system comprising: a first channel for supplying a chrominance signal; a second channel for supplying a reference signal of subcarrier frequency; three synchronous detectors coupled to the chrominance-signal channel for deriving three video signals representative of the coloring of the scene being televised; circuit means for translating components of the reference signal used for demodulating purposes to the synchronous detectors at such phase angles and amplitudes that the sum of any of said reference-signal components fed back to the chrominance channel is zero and for translating any chrominance-signal components supplied thereto with such phase angles and amplitudes that the sum of such components fed through to the reference-signal channel is zero; and an asymmetrical matrix circuit responsive to the three video signals for converting the video detection angles to the red, green, and blue color-difference angles and for modifying the video gains to develop red, green, and blue color-difference signals proportioned to obtain constant luminance operation of the receiver.

2. A three-phase synchronous detector system for the chrominance-signal portion of a color-television receiver, the system comprising: a first channel for supplying a chrominance signal; a second channel for supplying a reference signal of subcarrier frequency; three symmetrical synchronous detectors coupled to the chrominance-signal channel for deriving at phase angles spaced apart by 120° three video signals representative of the coloring of the scene being televised; circuit means for translating the reference signal to the synchronous detectors at such 120° phase angles and with equal amplitudes so that the sum of any reference-signal components fed back to the chrominance channel is zero and for translating any chrominance-signal components supplied thereto with such phase angles and amplitudes that the sum of such components fed through to the reference-signal channel is zero; and an asymmetrical matrix circuit responsive to the three video signals for converting the video detection angles to the asymmetrical red, green, and blue color-difference angles and for modifying the video gains to develop red, green, and blue color-difference signals proportioned to obtain constant luminance operation of the receiver.

3. A three-phase synchronous detector system for the chrominance-signal portion of a color-television receiver, the system comprising: a first channel for supplying a chrominance signal; a second channel for supplying a reference signal of subcarrier frequency; three synchronous detectors coupled to the chrominance-signal channel for deriving three video signals representative of the coloring of the scene being televised; transformer circuit means having a plurality of secondary windings which are interconnected to form a Y configuration for translating the reference signal to the synchronous detectors at such phase angles and amplitudes that the sum of any reference-signal components fed back to the chrominance channel is zero and for translating any chrominance-signal components supplied thereto with such phase angles and amplitudes that the sum of such components fed through to the reference-signal channel is zero; and an asymmetrical matrix circuit responsive to the three video signals for converting the video detection angles to the red, green, and blue color-difference angles and for modifying the video gains to develop red, green, and blue color-difference signals proportioned to obtain constant luminance operation of the receiver.

4. A three-phase synchronous detector system for the chrominance-signal portion of a color-television receiver, the system comprising: a first channel for supplying a chrominance signal; a second channel for supplying a reference signal of subcarrier frequency; three synchronous detectors coupled to the chrominance-signal channel for deriving three video signals representative of the coloring of the scene being televised; transformer circuit means having a plurality of secondary windings which are interconnected to form a Y configuration, the relative number of turns of the secondary windings being proportioned to translate the reference signal to the synchronous detectors at such phase angles and amplitudes that the sum of any reference-signal components fed back to the chrominance channel is zero, the mutual coupling coefficients of the secondary windings being proportioned to translate any chrominance-signal components supplied thereto with such phase angles and amplitudes that the sum of such components fed through to the reference-signal channel is zero; and an asymmetrical matrix circuit responsive to the three video signals for converting the video detection angles to the red, green, and blue color-difference angles and for modifying the video gains to develop red, green, and blue color-difference signals proportioned to obtain constant luminance operation of the receiver.

5. A three-phase synchronous detector system for the chrominance-signal portion of a color-television receiver, the system comprising: a first channel for supplying a chrominance signal; a second channel for supplying a reference signal of subcarrier frequency; three synchronous detectors coupled to the chrominance-signal channel for deriving three video signals representative of the coloring of the scene being televised; circuit means for translating the reference signal to the synchronous detectors at such phase angles and amplitudes that the sum of any reference-signal components fed back to the chrominance channel is zero and for translating any chrominance-signal components supplied thereto with such phase angles and amplitudes that the sum of such components fed through to the reference-signal channel is zero; and a resistor network proportioned to form an asymmetrical matrix circuit and responsive to the three video signals for converting the video detection angles to the red, green, and blue color-difference angles and for modifying the video gains to develop red, green, and blue color-difference signals proportioned to obtain constant luminance operation of the receiver.

6. A three-phase synchronous detector system for the chrominance-signal portion of a color-television receiver, the system comprising: a first channel for supplying a chrominance signal; a second channel for supplying a reference signal of subcarrier frequency; three synchronous detectors coupled to the chrominance-signal channel for deriving three video signals representative of the coloring of the scene being televised; circuit means for translating the reference signal to the synchronous detectors at such phase angles and amplitudes that the sum of any reference-signal components fed back to the chrominance channel is zero and for translating any chrominance-signal components supplied thereto with such phase angles and amplitudes that the sum of such components fed through to the reference-signal channel is zero; and a resistor network including a mutual resistor coupled across the outputs of two of the synchronous detectors for converting their video detection angles to the red and blue color-difference angles and including adding resistors coupled between the output of the third synchronous detector and an intermediate point on the mutual resistor for obtaining a signal corresponding to substantially the green color-difference angle, the resistance values of the resistors being proportioned for modifying the video gains to develop red, green, and blue color-difference signals proportioned to obtain constant luminance operation of the receiver.

7. A three-phase synchronous detector system for the chrominance-signal portion of a color-television receiver, the system comprising: a first channel for supplying a chrominance signal; a second channel for supplying a reference signal of subcarrier frequency; three synchronous detectors each including a similar electron-discharge device and energy-supply circuit, corresponding first electrodes of the devices being coupled to the chrominance-signal channel for enabling the synchronous detectors to derive three video signals representative of the coloring of the scene being televised; a transformer having a plurality of secondary windings which are interconnected to form a Y configuration having three output terminals individually coupled to corresponding second electrodes of the electron-discharge devices, a point part way down one leg of the Y being connected to a point of fixed reference potential, the transformer being responsive to the reference signal for developing at the three output terminals reference-signal components having phase angles and amplitudes such that the vector sum of any reference-signal components fed back to the chrominance channel is zero, the mutual coupling coefficients of the secondary windings being proportioned so that chrominance-signal components present at the transformer output terminals will be translated by the transformer with such phase angles and amplitudes that the vector sum of such components fed through to the reference-signal channel is zero; and an asymmetrical matrix circuit coupled to corresponding output electrodes of the electron-discharge devices and responsive to the three video signals for converting the video detection angles to the red, green, and blue color-difference angles and for modifying the video gains to develop red, green, and blue color-difference signals proportioned to obtain constant luminance operation of the receiver.

8. A three-phase synchronous detector system for the chrominance-signal portion of a color-television receiver, the system comprising: a first channel for supplying a chrominance signal; a second channel for supplying a reference signal of subcarrier frequency; three synchronous detectors each including a similar electron-discharge device and energy-supply circuit, corresponding first electrodes of the devices being coupled to the chrominance-signal channel for enabling the synchronous detectors to derive three video signals representative of the coloring of the scene being televised; a transformer having a plurality of secondary windings which are interconnected to form a Y configuration having three output terminals individually coupled to corresponding second electrodes of the electron-discharge devices, the input of the transformer being coupled to the reference-signal channel and a point part way down one leg of the Y being connected to a point of fixed reference potential, the relative number of turns of the secondary windings being proportioned to translate the reference signal for developing at the three output terminals reference-signal components having phase angles and amplitudes such that the vector sum of any reference-signal components fed back to the chrominance channel is zero, the mutual coupling coefficients of the secondary windings being proportioned so that chrominance-signal components present at the transformer output terminals will be translated by the transformer with such phase angles and amplitudes that the vector sum of such components fed through to the reference-signal channel is zero; and a resistor network including a mutual resistor coupled across corresponding output electrodes of two of the electron-discharge devices for converting their video detection angles to the red and blue color-difference angles and including adding resistors coupled between the corresponding output electrode of the third electron-discharge device and an intermediate point on the mutual resistor for obtaining a signal corresponding to substantially the green color-difference angle, the resistance values of the resistors being proportioned for modifying the video gains to develop red, green, and blue color-difference signals proportioned to obtain constant luminance operation of the receiver.

References Cited in the file of this patent

UNITED STATES PATENTS 2,725,422 Stark ---------------- Nov. 29, 1955
2,773,929 Loughlin ------------- Dec. 11, 1956

OTHER REFERENCES

RCA Color Television Receiver Model CT–100, pages 31 to 34, March 1954. (Copy in Div. 41.)